(12) United States Patent
Dauderman et al.

(10) Patent No.: US 9,835,186 B2
(45) Date of Patent: Dec. 5, 2017

(54) HYDRAULIC FLUSHING SYSTEM AND METHOD

(71) Applicant: Deere & Company, Moline, IL (US)

(72) Inventors: Bradley C. Dauderman, Dubuque, IA (US); Donald O. Johannsen, Dubuque, IA (US); John R. Mahrenholz, Peosta, IA (US); Chris J. Schaub, Asbury, IA (US); Kyle S. Droessler, Cuba City, WI (US); Brian J. Althoff, Dubuque, IA (US); Todd R. Simms, Peosta, IA (US); Denis J. Roling, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 531 days.

(21) Appl. No.: 14/300,930

(22) Filed: Jun. 10, 2014

(65) Prior Publication Data
US 2015/0354609 A1 Dec. 10, 2015

(51) Int. Cl.
*F16D 31/02* (2006.01)
*F15B 21/00* (2006.01)
*F15B 21/04* (2006.01)
*F16H 61/4104* (2010.01)
*F16H 57/04* (2010.01)

(52) U.S. Cl.
CPC ............ *F15B 21/005* (2013.01); *F15B 21/04* (2013.01); *F15B 21/042* (2013.01); *F16H 57/0408* (2013.01); *F16H 61/4104* (2013.01)

(58) Field of Classification Search
CPC ............ F16H 61/4104; F16H 61/4165; F15B 21/042; F15B 2211/611
See application file for complete search history.

(56) References Cited

U.S. PATENT DOCUMENTS

| 4,651,526 A | 3/1987 | Mann et al. |
| 4,939,900 A * | 7/1990 | Furumoto ........... F16H 61/4104 60/487 |
| 6,973,783 B1 | 12/2005 | Hauser et al. |
| 7,640,738 B1 | 1/2010 | Hauser et al. |

FOREIGN PATENT DOCUMENTS

| DE | 19612873 A1 | 10/1997 |
| DE | 102006016006 A1 | 10/2007 |
| EP | 1600666 A1 | 11/2005 |
| EP | 1900971 A1 | 3/2008 |
| JP | H1130304 A | 2/1999 |

OTHER PUBLICATIONS

European Search Report issued in counterpart application No. 15169911.3, dated Oct. 29, 2015 (7 pages).

* cited by examiner

*Primary Examiner* — Michael Leslie

(57) ABSTRACT

A hydraulic flushing system comprises a hydraulic machine including a case drain, a gearbox having a cavity, and a flushing valve. The case drain is included in a hydraulic pump or a hydraulic motor. The flushing valve is fluidly connected to the case drain, fluidly connected to the cavity, and fluidly positioned between the case drain and the cavity. The flushing valve is configured to selectively allow hydraulic fluid to flow from the case drain to the cavity.

19 Claims, 7 Drawing Sheets

HYDRAULIC FLUSHING SYSTEM AND METHOD

FIELD OF THE DISCLOSURE

The present disclosure relates to a hydraulic flushing system.

BACKGROUND

Work vehicles may include hydraulic flushing systems which may be used to flush other components, such as gearboxes, to remove contaminants.

SUMMARY

According to an aspect of the present disclosure, a hydraulic flushing system includes a hydraulic machine including a case drain, a gearbox having a cavity, and a flushing valve. The case drain is included in a hydraulic pump or a hydraulic motor. The flushing valve is fluidly connected to the case drain, fluidly connected to the cavity, and fluidly positioned between the case drain and the cavity. The flushing valve is configured to selectively allow hydraulic fluid to flow from the case drain to the cavity.

According to another aspect of the present disclosure, a method of hydraulic flushing includes operating a work vehicle in a manner which causes hydraulic fluid to flow from a case drain of a hydraulic machine of the work vehicle and actuating a flushing valve to direct the hydraulic fluid to flow from the case drain through a cavity of a gearbox.

According to another aspect of the present disclosure, a hydraulic flushing system for a work vehicle includes a pressure source, a first final drive, a second final drive, and a flushing valve. The pressure source is a hydraulic pressure source included in the work vehicle. The first final drive has a first cavity. The second final drive has a second cavity. The flushing valve has a first port, a second port, and a third port. The first port is fluidly connected to the case drain. The second port is fluidly connected to the first cavity. The third port is fluidly connected to the second cavity. The flushing valve is configured to prevent hydraulic fluid flow through the first port in a first mode and to allow hydraulic fluid flow from the first port to the second port in a second mode.

The above and other features will become apparent from the following description and accompanying drawings.

BRIEF DESCRIPTION OF THE DRAWINGS

The detailed description of the drawings refers to the accompanying figures in which.

DETAILED DESCRIPTION

Figure 1:
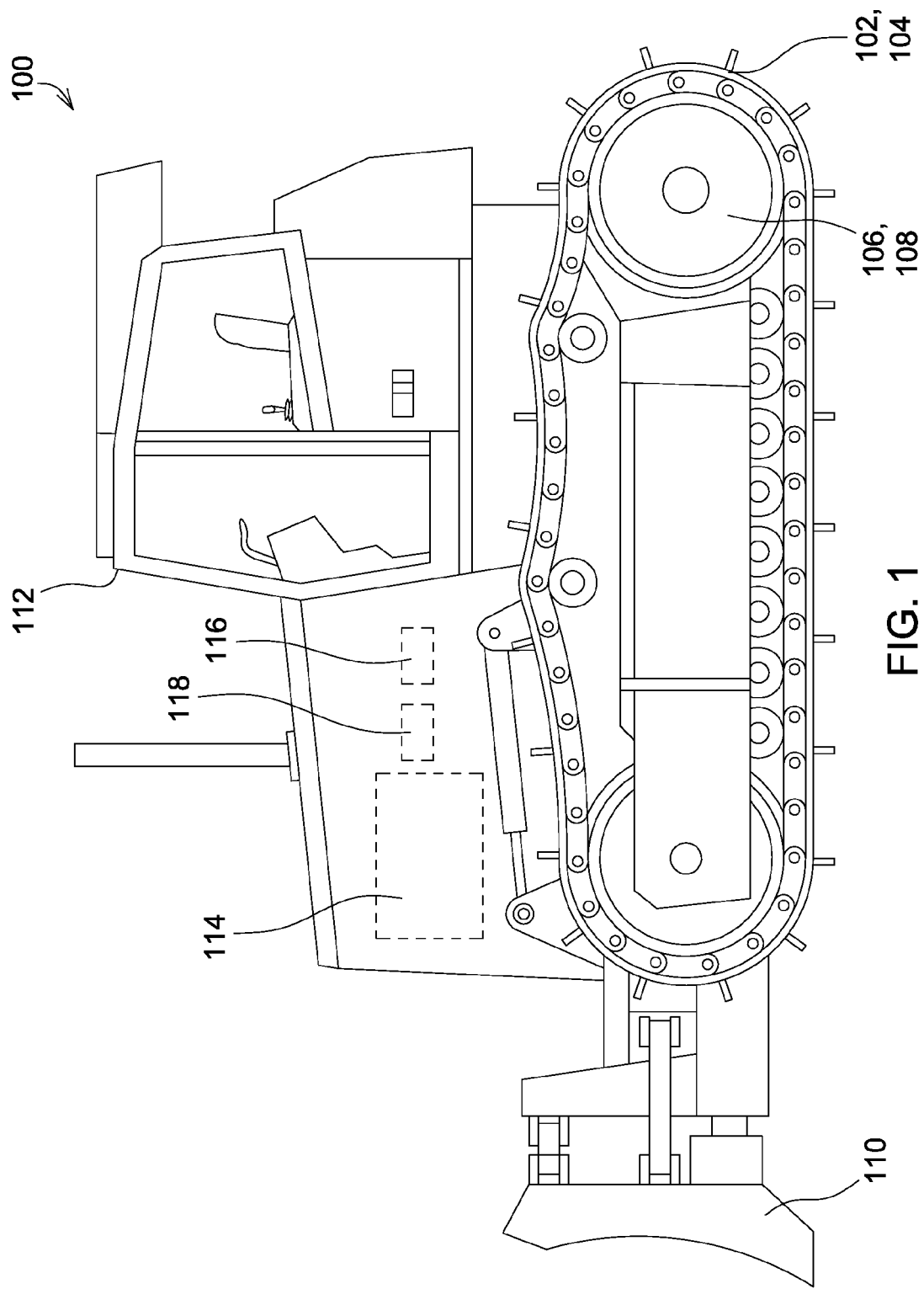
FIG. 1 is a left side view of a work vehicle.

FIG. 1 illustrates work vehicle 100, having left track 102 (right track 104 not shown), left final drive 106 (right final drive 108 not shown, see FIG. 2), blade 110, operator station 112, engine 114, left hydrostatic pump 116, and right hydrostatic pump 118. Work vehicle 100 is illustrated as a crawler, but may be any work vehicle with a hydraulic system and a component for which flushing with hydraulic fluid may be desirable, such as an articulated dump truck, backhoe loader, excavator, forwarder, harvester, haul truck, knuckleboom loader, motor grader, skid steer loader, skidder, sprayer, tractor, or wheel loader, to name a few examples.

Work vehicle 100 may be controlled by an operator located in operator station 112. The operator may command the movement of blade 110, which is actuated by hydraulic cylinders receiving hydraulic fluid from a control valve, which in turn receives fluid from a hydraulic pump. The operator may also command work vehicle 100 to move forward, move backward, and turn. These commands result in left hydrostatic pump 116 and right hydrostatic pump 118 directing pressurized fluid so as to control the movement of left final drive 106 and right final drive 108, respectively, as further described below with reference to FIG. 2. The rotation of left final drive 106 and right final drive 108 controls the movement of left track 102 and right track 104, respectively, which in turn controls the movement and turning of work vehicle 100 along a ground surface. Engine 114, which may be a diesel engine, powers work vehicle 100, including by turning left hydrostatic pump 116 and right hydrostatic pump 118.

Figure 2:
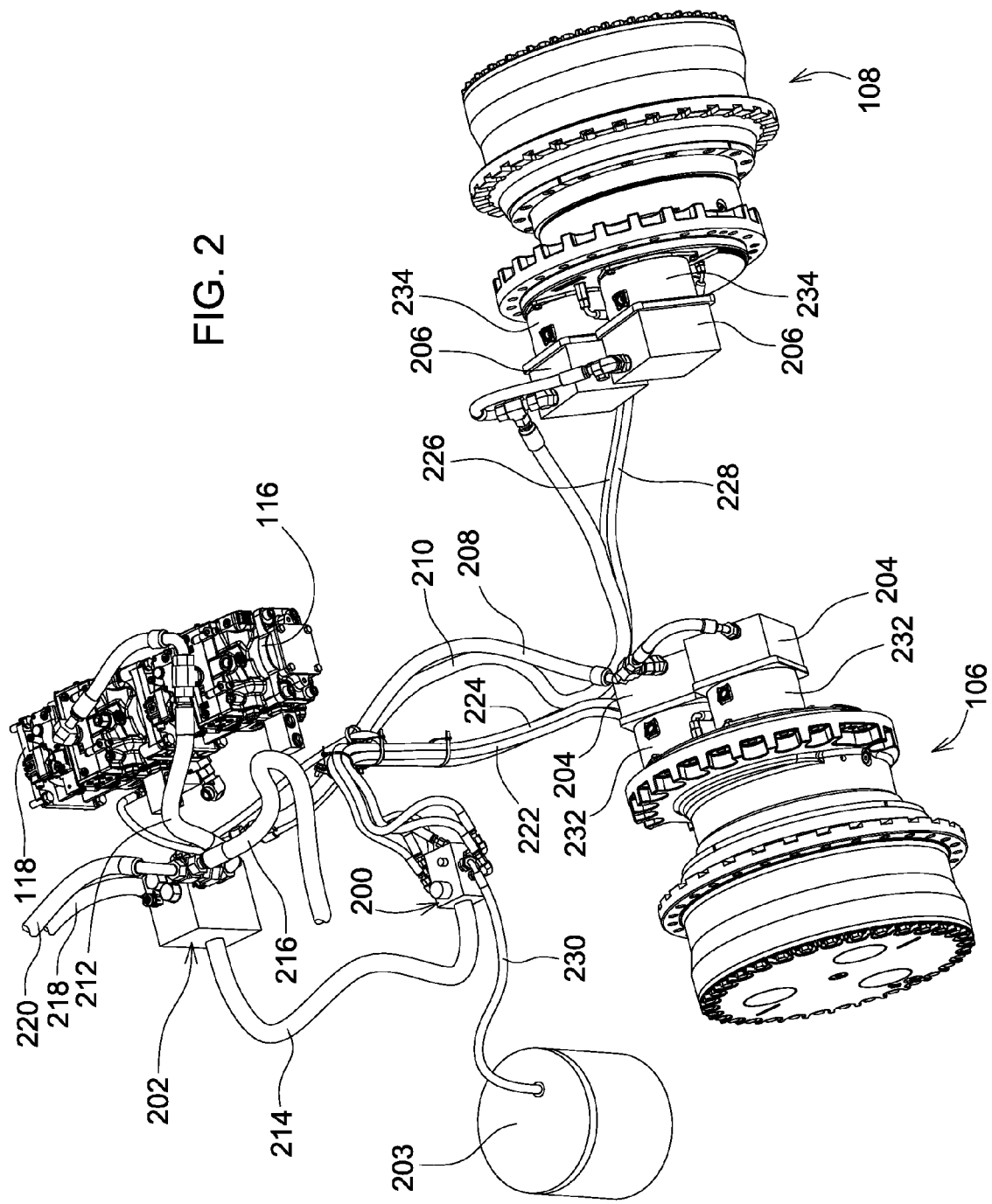
FIG. 2 is a perspective view of a hydraulic flushing system fluidly connected to final drives.

FIG. 2 illustrates a hydraulic flushing system fluidly connected to left final drive 106 and right final drive 108. Flushing valve 200 is fluidly connected to left final drive 106, right final drive 108, cooling valve 202, and drain container 203. Cooling valve 202 is fluidly connected to left hydrostatic pump 116, right hydrostatic pump 118, left hydraulic motors 204, and right hydraulic motors 206. Specifically, cooling valve 202 is fluidly connected to a case drain of each of left hydrostatic pump 116, right hydrostatic pump 118, left hydraulic motors 204, and right hydraulic motors 206. In this embodiment, fluid connections are achieved by the use of hydraulic lines with connectors on each end that are configured to mate with connectors on components to achieve a fluid-tight seal (e.g., threaded connectors which, when mated, compress an o-ring seal between a smooth face on each connector). In alternative embodiments, fluid connections may be formed by other methods well known in the art, including by mounting components directly to each other with sealed connections between or by including both components in a manifold that contains passageways which connect the components.

Engine 114 (not shown in FIG. 2) turns left hydrostatic pump 116 and right hydrostatic pump 118, allowing the pumps to provide pressurized hydraulic fluid. Each of left hydrostatic pump 116 and right hydrostatic pump 118 may be controlled to alter the flow rate and direction of flow of the pump, for example through a movable swashplate whose angle controls the direction and rate of hydraulic fluid flow through the work ports of the pump. The work ports of left hydrostatic pump 116 are fluidly connected to the work ports of left hydraulic motors 204, such that left hydrostatic pump 116 controls the force, speed, and direction of travel for left hydraulic motors 204 by directing pressurized fluid to left hydraulic motors 204. Similarly, the work ports of right hydrostatic pump 118 are fluidly connected to the work ports of right hydraulic motors 206, such that right hydrostatic pump 118 controls the force, speed, and direction of travel for right hydraulic motors 206 by directing pressurized fluid to right hydraulic motors 206. To simplify the figure, the hydraulic lines fluidly connecting the work ports of these pumps and motors are not shown in FIG. 2. Each of left hydrostatic pump 116, right hydrostatic pump 118, left hydraulic motors 204, and right hydraulic motors 206 are a hydraulic machine, capable of transferring force and/or energy between mechanical and hydraulic systems. For example, left hydraulic motors 204 may take hydraulic energy from pressurized hydraulic fluid received from left hydrostatic pump 116 and produce mechanical energy in the form of torque transmitted through left final drive 106 to accelerate work vehicle 100. Left hydraulic motors 204 may also take mechanical energy from left final drive 106, for example torque absorbed from left final drive 106 to decelerate work vehicle 100, and produce hydraulic energy in the form of pressurized hydraulic fluid sent to left hydrostatic pump 116.

Left hydraulic motors 204 and right hydraulic motors 206 are rotationally coupled to left final drive 106 and right final drive 108 via left park brakes 232 and right park brakes 234, respectively. This rotational coupling is achieved through left final drive 106 and right final drive 108 mating through a splined shaft/splined receptacle pairing with left park brakes 232 and right park brakes 234, respectively, which in turn mate through a splined shaft/splined receptacle pairing with left hydraulic motors 204 and right hydraulic motors 206, respectively. Left final drive 106 and right final drive 108 are thereby driven by left hydraulic motors 204 and right hydraulic motors 206, respectively. Left final drive 106 and right final drive 108 are gearboxes that include internal gearing which reduces the input rotational speed provided by left hydraulic motors 204 and right hydraulic motors 206 to an output rotational speed which drives left track 102 and right track 104, respectively. This embodiment relates to hydraulic flushing of final drives, but alternative embodiments may relate to hydraulic flushing of other components such as other gearboxes, including transmissions, axles, transaxles, power takeoffs, and accessory drives.

For left hydrostatic pump 116, right hydrostatic pump 118, left hydraulic motors 204, and right hydraulic motors 206, hydraulic fluid may flow from a charge pump through a charge relief valve or leak from the work passages of the pump or motor into a case drain area. This case drain area includes a series of internal cavities and passages which interconnect to allow such hydraulic flows to reach a case drain, which allows the hydraulic fluid to be drained from the pump or motor. This case drain flow is normal for the operation of the pump or motor, and the rate of flow may vary based on the condition of the pump or motor, the temperature of the hydraulic fluid, the pressure of the work passages in the pump or motor, and the volume of charge fluid entering the circuit. Depending on the design of the pump or motor, the hydraulic system may need to be configured to keep the pressure of the case drain flow very close to atmospheric pressure or the design of the pump or motor may allow the case drain flow to occur at an increased pressure. As one example, a hydraulic system may be designed to keep the case drains below a maximum pressure of 15 pounds per square inch (psi).

Case drain flow from left hydrostatic pump 116, right hydrostatic pump 118, left hydraulic motors 204, and right hydraulic motors 206 travels to cooling valve 202 through the case drains of each of those pumps and motors. Case drain flow from left hydraulic motors 204 travels through hydraulic line 208 to cooling valve 202. Case drain flow from right hydraulic motors 206 travels through hydraulic line 210 to cooling valve 202. Case drain flow from left hydrostatic pump 116 and right hydrostatic pump 118 travels through hydraulic line 212 to cooling valve 202. Cooling valve 202 is fluidly connected to flushing valve 200 through hydraulic line 214, a hydraulic reservoir (not shown) through hydraulic line 216, and a hydraulic cooler (not shown) through hydraulic line 218. The hydraulic cooler in turn is fluidly connected to the hydraulic reservoir through hydraulic line 220. Cooling valve 202 is therefore fluidly connected to hydraulic reservoir both directly through hydraulic line 216 and indirectly through hydraulic line 218, the hydraulic cooler, and hydraulic line 220. Cooling valve 202 may allow the case drain flow it receives to flow to flushing valve 200, the hydraulic reservoir, or the hydraulic cooler as further described below with reference to FIG. 6.

Flushing valve 200 is fluidly positioned downstream of the case drains of left hydrostatic pump 116, right hydrostatic pump 118, left hydraulic motors 204, and right hydraulic motors 206, and fluidly positioned upstream of left final drive 106 and right final drive 108, and is therefore fluidly positioned between the case drains and the final drives. Flushing valve 200 receives hydraulic fluid from cooling valve 202 through hydraulic line 214. Flushing valve 200 may allow hydraulic fluid to flow to left final drive 106 through hydraulic line 222 and allow it to return from left final drive 106 through hydraulic line 224. Flushing valve 200 may direct hydraulic fluid to right final drive 108 through hydraulic line 226 and allow it to return from right final drive 108 through hydraulic line 228. Hydraulic line 222 and hydraulic line 224 are each fluidly connected to a cavity within left final drive 106, and hydraulic line 226 and hydraulic line 228 are each fluidly connected to a cavity within right final drive 108, as described further below with reference to FIG. 5. Flushing valve 200 is also fluidly connected to drain container 203 through hydraulic line 230 (which may also be referred to as a drain hose). Drain container 203 may be any container suitable for collecting used hydraulic fluid. Depending on the type of container used for drain container 203, hydraulic line 230 may not mate with a connector on drain container 203 but may instead be placed inside or above drain container 203 such that hydraulic fluid flowing out of hydraulic line 230 is collected within drain container 203.

Hydraulic fluid may therefore flow from the case drains of left hydrostatic pump 116, right hydrostatic pump 118, left motors 204, and right motors 206 to cooling valve 202. From cooling valve 202, the hydraulic fluid may flow to the hydraulic reservoir, the hydraulic cooler, or flushing valve 200. From flushing valve 200, the hydraulic fluid may flow through cavities in left final drive 106 and right final drive 108, back to flushing valve 200, and on to drain container 203. In this way, hydraulic fluid from the case drains of the pumps and motors in FIG. 2 may be used to flush left final drive 106 and right final drive 108. Using case drain flow may provide some benefits in certain circumstances. Such flow is often warmed because the hydraulic fluid is in a working circuit of work vehicle 100 and has flowed through working areas of a hydraulic machine (e.g., a hydraulic pump or hydraulic motor). Such flow may be pressurized, enabling it to be forced through valves, hydraulic lines, the cavities of left final drive 106 and right final drive 108, and out to drain container 203 without the need for an additional pressurizing component. Such flow may also remain below a relatively low maximum pressure, avoiding damage to components, such as left final drive 106 and right final drive 108, that may not be intended to be exposed to high pressures.

While the illustrated embodiment uses case drain flow as a pressure source, other low pressure sources for flushing valve 200 may be suitable in other circumstances. For example, a high pressure source could be converted to a low pressure source by placing an orifice upstream of a relief valve which will relieve hydraulic fluid at the low pressure cutoff. Or, a hydraulic pump, such as an implement pump or hydraulic fan pump, could be operated in a low pressure mode (for example, through adjustable valves or by reducing output flow to a low level) when hydraulic flushing is desired to provide a low pressure source when needed. Or, a separate pump may be dedicated to the flushing system.

Figure 6:
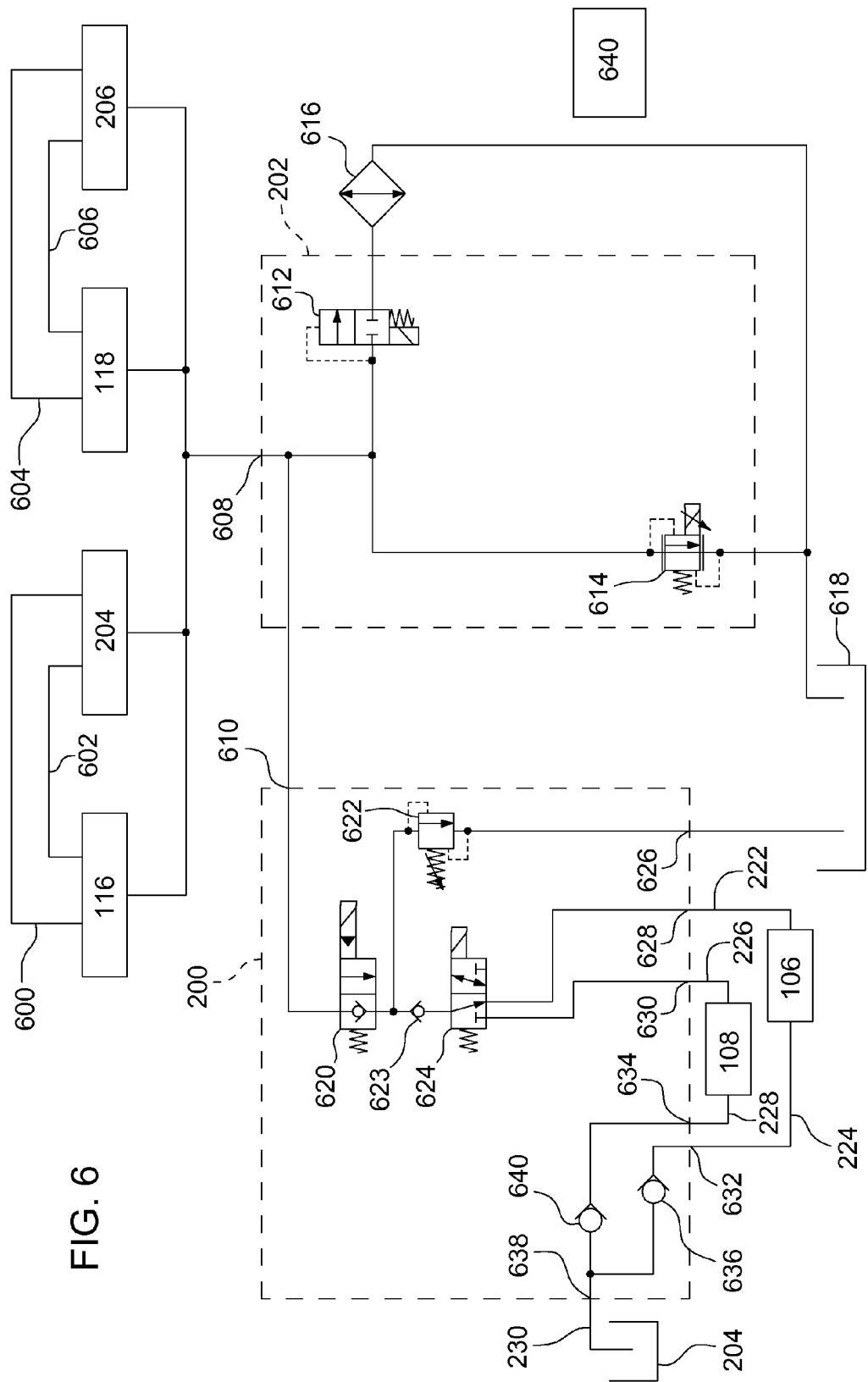
FIG. 6 is a hydraulic schematic of the hydraulic flushing system.

As used herein, "valve" may refer to a single valve (e.g., a single spool, poppet, or check) or a collection of valves and associated components (e.g., a manifold or machined block containing multiple spools, poppets, checks, and associated orifices or other hydraulic logic). In this embodiment, both flushing valve 200 and cooling valve 202 are manifolds containing multiple components, as can be seen in FIG. 6. In this embodiment, flushing valve 200 and cooling valve 202 are separate manifolds, but in alternative embodiments these two components may be integrated into a single manifold. Such integration may eliminate the need for ports and hydraulic lines connecting the two valves, which may reduce complexity, cost, and leakage points, and therefore may be desirable for some designs. In other contexts, such integration may be less desirable, for example if flushing valve 200 and cooling valve 202 may be used independently such that some applications and designs will use one of the valves but not the other.

Figure 3:
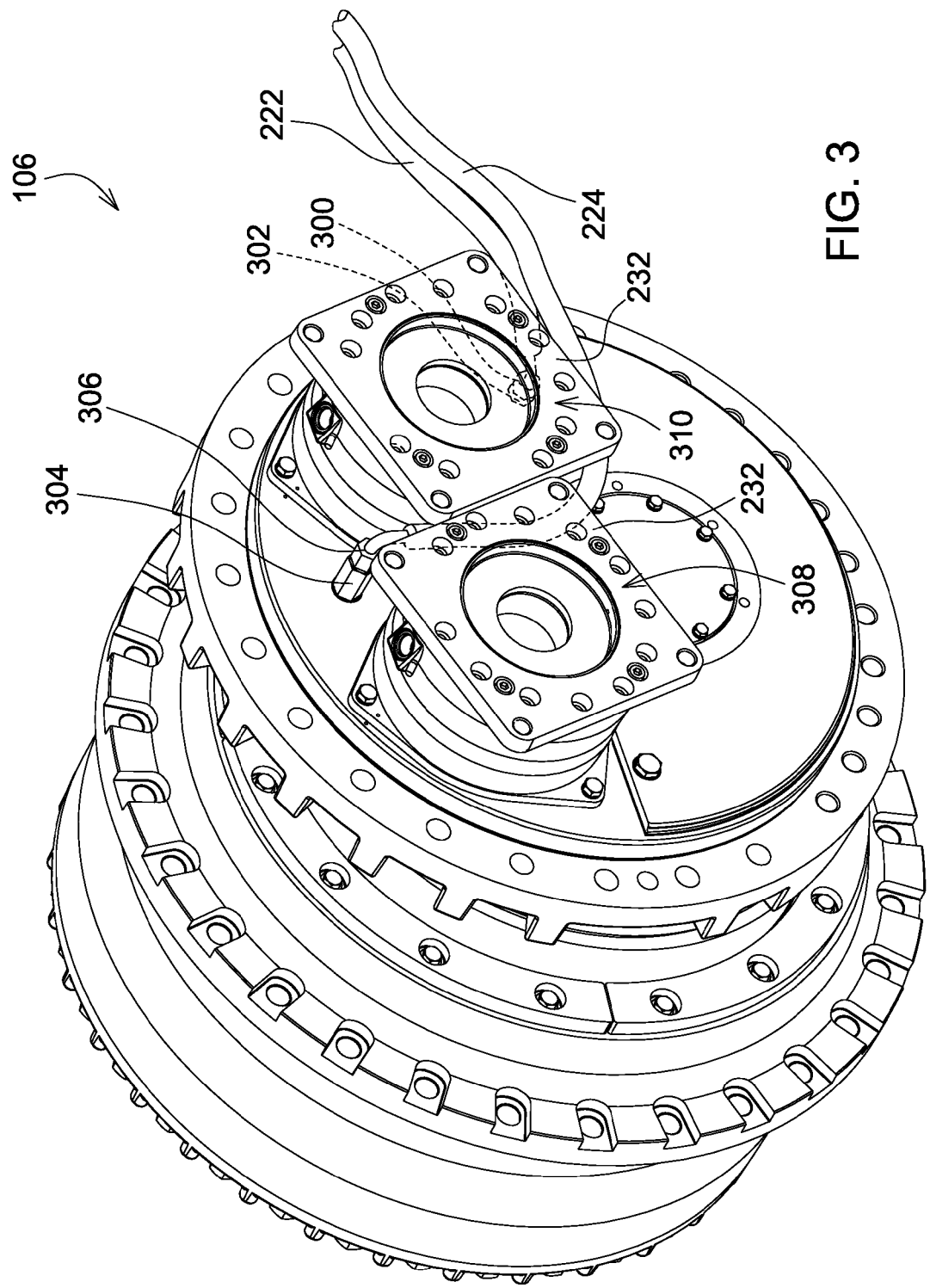
FIG. 3 is a perspective view of a first final drive fluidly connected to the hydraulic flushing system.

FIG. 3 illustrates left final drive 106 with hydraulic line 222 and hydraulic line 224 fluidly connected to it. Hydraulic line 222 includes hydraulic connector 300, which threads onto mating hydraulic connector 302 included in left final drive 106, and thereby compresses a seal between a surface of hydraulic connector 300 and a surface of hydraulic connector 302 to form a fluid-tight seal. Hydraulic line 222 carries hydraulic fluid from flushing valve 200 to a cavity within left final drive 106. After entering this cavity, hydraulic fluid flows through the cavity and exits through hydraulic line 224 which returns such flow to flushing valve 200. Hydraulic line 224 connects to left final drive 106 in a similar manner to hydraulic line 222, through hydraulic connector 304 included in left final drive 106 mating with hydraulic connector 306 included in hydraulic line 224.

Mount 308 and mount 310 provide mounting pads for left hydraulic motors 204, allowing them to be attached to, and supported by, left final drive 106 via left park brakes 232. When mounted, left hydraulic motors 204 are rotationally coupled to left final drive 106 through left park brakes 232 and a series of splined shafts mated with splined receptacles.

Figure 4:
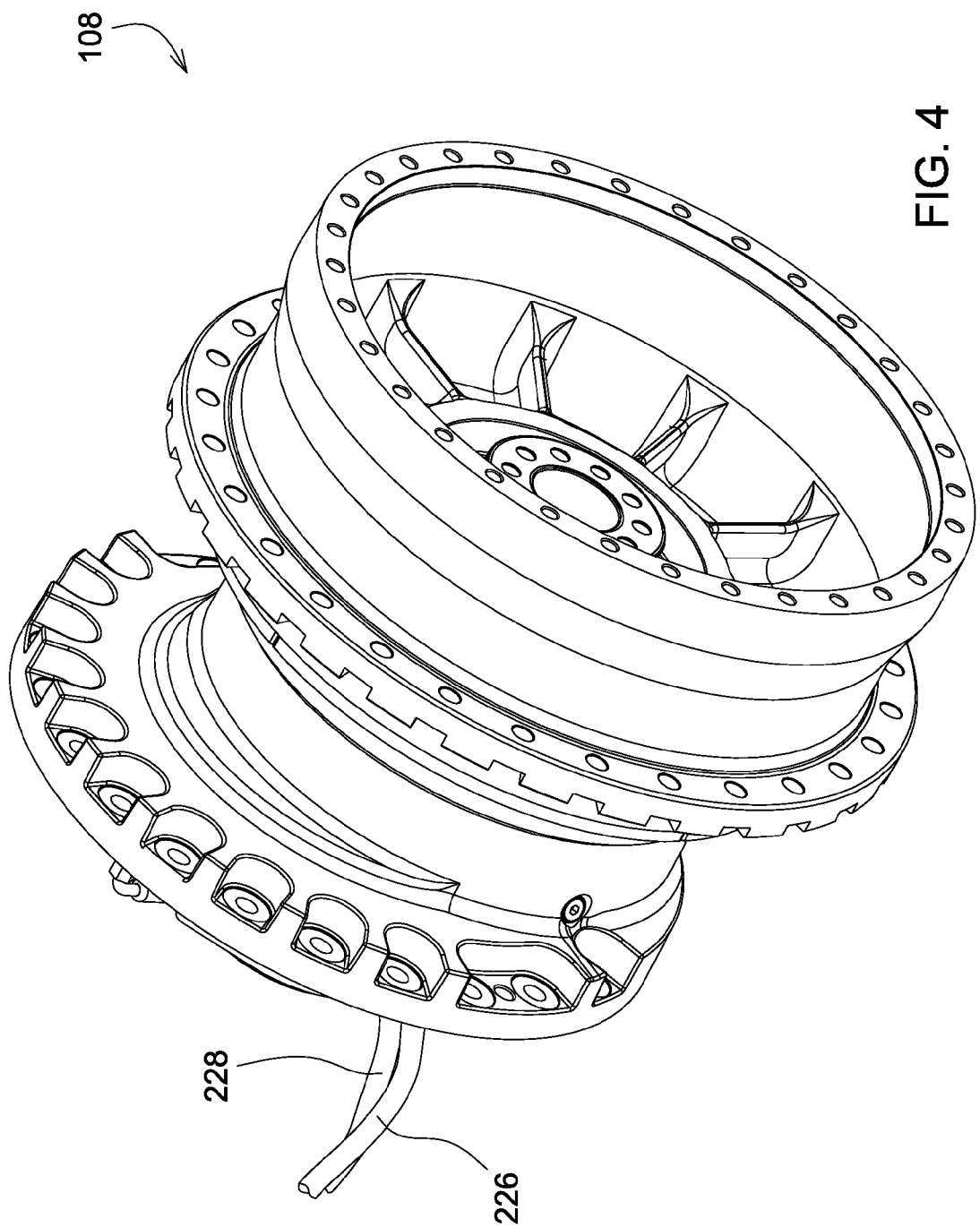
FIG. 4 is a perspective view of the first final drive.

FIG. 4 illustrates right final drive 108 with hydraulic line 226 and hydraulic line 228 fluidly connected to it. As with left final drive 106, hydraulic line 226 and hydraulic line 228 are each fluidly connected to a cavity within right final drive 108.

Figure 5:
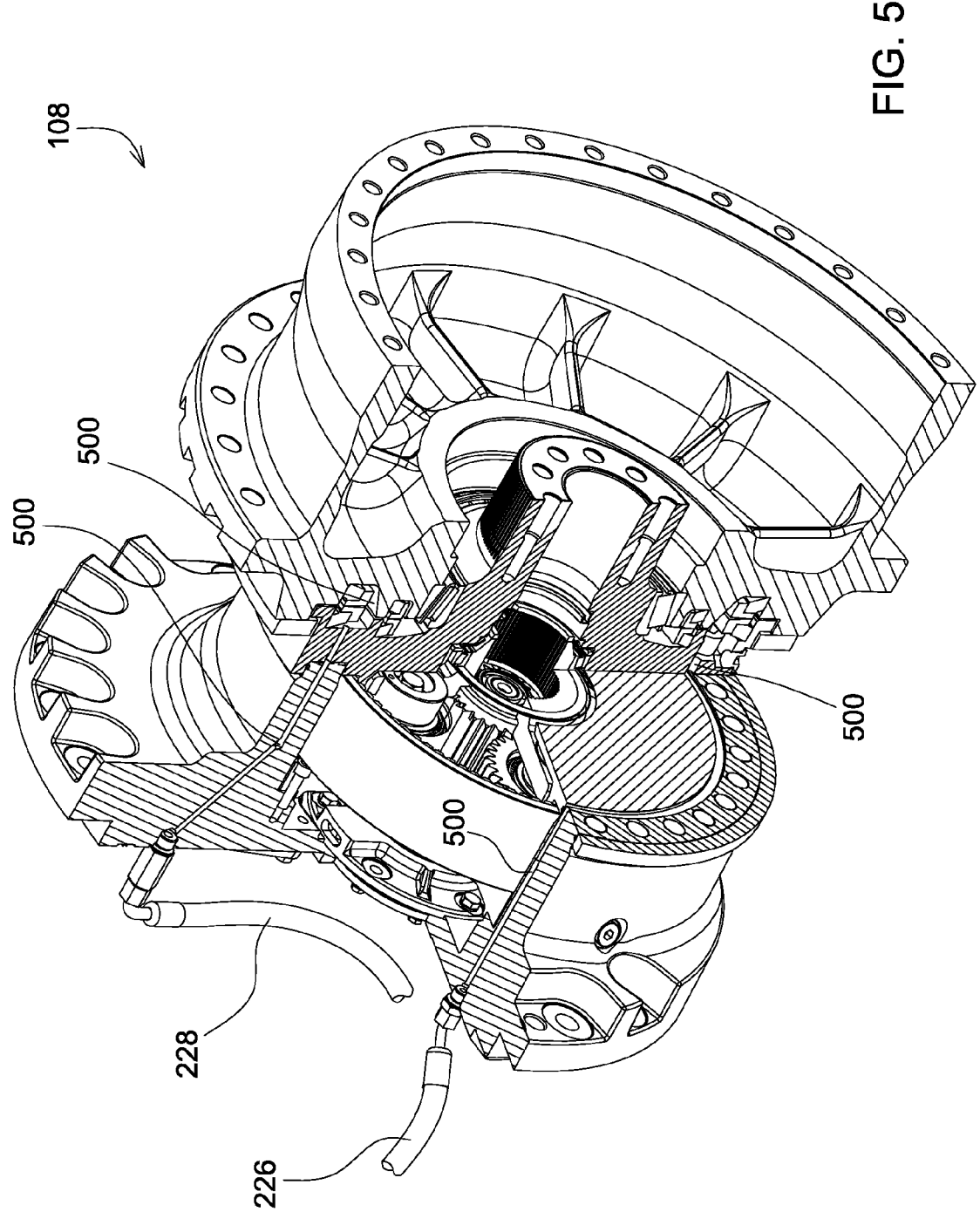
FIG. 5 is a partial cutaway perspective view of the first final drive.

FIG. 5 is a partial cutaway view of right final drive 108 in approximately the same orientation as FIG. 4, illustrating cavity 500 included in right final drive 108. In this embodiment, left final drive 106 includes a similar cavity (not shown). Cavity 500 includes various passageways and volumes within right final drive 108, including two passageways that connect hydraulic line 226 and hydraulic line 228 with larger, often annular, passageways and volumes within right final drive 108. Depending on the design, cavity 500 may be filled with a lubricating fluid, such as hydraulic fluid, partially filled with a lubricating fluid, or not filled but having a layer of lubricating fluid on certain surfaces or components.

Contaminants may enter cavity 500, and such contaminants may damage right final drive 108 either through their presence in cavity 500 or as they migrate into other cavities within right final drive 108 which contain components which are sensitive to damage when exposed to contamination. Cavity 500 may be flushed with hydraulic fluid to remove or reduce such contaminants, which may be carried away with the hydraulic fluid traveling through cavity 500 and exiting through hydraulic line 228.

FIG. 6 is a hydraulic schematic illustrating a hydraulic flushing system. The work ports of left hydrostatic pump 116 are fluidly connected to the work ports of left motors 204 through hydraulic line 600 and hydraulic line 602. The work ports of right hydrostatic pump 118 are fluidly connected to the work ports of right motors 206 through hydraulic line 604 and hydraulic line 606. A case drain of each of left hydrostatic pump 116, right hydrostatic pump 118, left motors 204, and right motors 206 is fluidly connected to cooling valve 202 through port 608 and fluidly connected to flushing valve 200 through cooling valve 202 and port 610 of flushing valve 200.

Cooling valve 202 includes solenoid-actuated on/off valve 612 and solenoid-actuated proportional relief valve 614. In alternative embodiments, these valves may be actuated through a different mechanism, including manual actuation or no actuation such that they respond in a fixed manner based on the pressures to which they are exposed. In this embodiment, on/off valve 612 will move to an opened position when the pressure at the inlet to on/off valve 612, which is approximately the pressure at port 608 and the pressure at the case drains of left hydrostatic pump 116, right hydrostatic pump 118, left motors 204, and right motors 206, is sufficient to overcome a spring biasing on/off valve 612 to a closed position. When in its opened position, on/off valve 612 allows hydraulic fluid to flow from port 608, and the case drains, through hydraulic cooler 616 to hydraulic reservoir 618. When in its closed position, on/off valve 612 prevents such flow. On/off valve 612 is solenoid-actuated, so the solenoid may be energized and may thereby resist movement of on/off valve 612 to its opened position, tending to prevent hydraulic fluid from flowing to hydraulic cooler 616. Proportional relief valve 614 allows hydraulic fluid to flow through it when the pressure differential across the valve is sufficient to overcome a spring biasing the valve to its closed position. Proportional relief valve 614 will tend to prevent the pressure at port 608, and at the case drains, from rising above a maximum pressure above the pressure of hydraulic reservoir 618. Proportional relief valve 614 is solenoid-actuated, so the solenoid may be energized to reduce the pressure necessary to open the valve, and to thereby reduce the maximum pressure of port 608 and the case drains.

Flushing valve 200 includes solenoid-actuated on/off valve 620, adjustable relief valve 622, and solenoid-actuated directional valve 624. In alternative embodiments, each of on/off valve 620 and directional valve 624 may be solenoid-actuated or manually actuated, and relief valve 622 may be solenoid-actuated, adjustable, or non-adjustable to relieve pressure at a fixed pressure threshold. On/off valve 620 is spring-biased to a closed position which prevents the flow of hydraulic fluid through it and through port 610. On/off valve 620 may be actuated, for example by a solenoid in this embodiment, to shift to an opened position which allows hydraulic fluid to flow through on/off valve 620. Relief valve 622 allows hydraulic fluid to flow to hydraulic reservoir 618 through port 626 of flushing valve 200 when the pressure differential across the valve is sufficient to overcome the spring biasing the valve to a closed position. Relief valve 622 will tend to prevent directional valve 624 and any components downstream of directional valve 624 (including cavities within left final drive 106 and right final drive 108) from experiencing a pressure greater than a maximum pressure. This maximum pressure can be adjusted by adjusting the spring biasing relief valve 622 to a closed position. Relief valve 622 may prevent damage to left final drive 106 and right final drive 108 by limiting the maximum pressure to which each final drive is exposed during flushing. Check valve 623 is fluidly positioned upstream of directional valve 624 and allows hydraulic fluid to flow to directional valve 624 from on/off valve 620, but does not allow hydraulic fluid to flow from left final drive 106 and right final drive 108 back through directional valve 624 to the remainder of flushing valve 200. For example, check valve 623 serves to prevent hydraulic fluid which has been exposed to left final drive 106 or right final drive 108, and which may therefore contain contaminants, from backing up through flushing valve 200 and going through relief valve 622 into hydraulic reservoir 618 and potentially damaging other hydraulic components.

Directional valve 624 is fluidly positioned downstream of on/off valve 620 and fluidly positioned upstream of left final drive 106 and right final drive 108, and is therefore fluidly positioned between on/off valve 620 and left final drive 106 and right final drive 108. Directional valve 624 allows hydraulic fluid to flow to one of left final drive 106 or right final drive 108. A spring biases directional valve 624 to a first position which allows hydraulic fluid to flow from on/off valve 620 to left final drive 106 through port 628 of flushing valve 200, but a solenoid may actuate directional valve 624 to shift it to a second position which allows hydraulic fluid to flow to right final drive 108 through port 630 of flushing valve 200.

Each of the solenoids in cooling valve 202 and flushing valve 200 may be actuated by controller 640. Controller 640 is electrically connected to each of these solenoids, but, for simplicity, such electrical connections are not shown in FIG. 6. Controller 640 may actuate (e.g, energize) the solenoids in accordance with instructions stored in controller 640 or accessible to controller 640, for example instructions based on control system 700 described below with reference to FIG. 7.

On/off valve 620 and directional valve 624 allow flushing valve 200 to selectively (1) prevent hydraulic fluid flow through flushing valve 200, which occurs when on/off valve 620 is in its closed position, (2) allow hydraulic fluid flow from the case drains of left hydrostatic pump 116, right hydrostatic pump 118, left motors 204, and right motors 206 to a cavity of left final drive 106 through flushing valve 200, which occurs when on/off valve 620 is in its opened position and directional valve 624 is in its first position, and (3) allow hydraulic fluid flow from the case drains of left hydrostatic pump 116, right hydrostatic pump 118, left motors 204, and right motors 206 to cavity 500 of right final drive 108 through flushing valve 200, which occurs when on/off valve 620 is in its opened position and directional valve 624 is in its second position. In both (2) and (3), relief valve 622 may limit the maximum pressure within flushing valve 200, left final drive 106, and right final drive 108 by relieving hydraulic fluid to hydraulic reservoir 618 through port 626 as necessary.

When hydraulic fluid is flowing to a cavity in left final drive 106 or cavity 500 in right final drive 108, hydraulic fluid will flow from such cavities to port 632 and port 634 of flushing valve 200, respectively. Hydraulic fluid flowing from left final drive 106 will flow through port 632, check valve 636, port 638, and hydraulic line 230 before flowing to drain container 203. Hydraulic fluid flowing from right final drive 108 will flow through port 634, check valve 640, port 638, and hydraulic line 230 before flowing to drain container 203. In this way, hydraulic fluid which has flushed left final drive 106 or right final drive 108, and which may contain contaminants, may be collected in drain container 203 for disposal.

Figure 7:
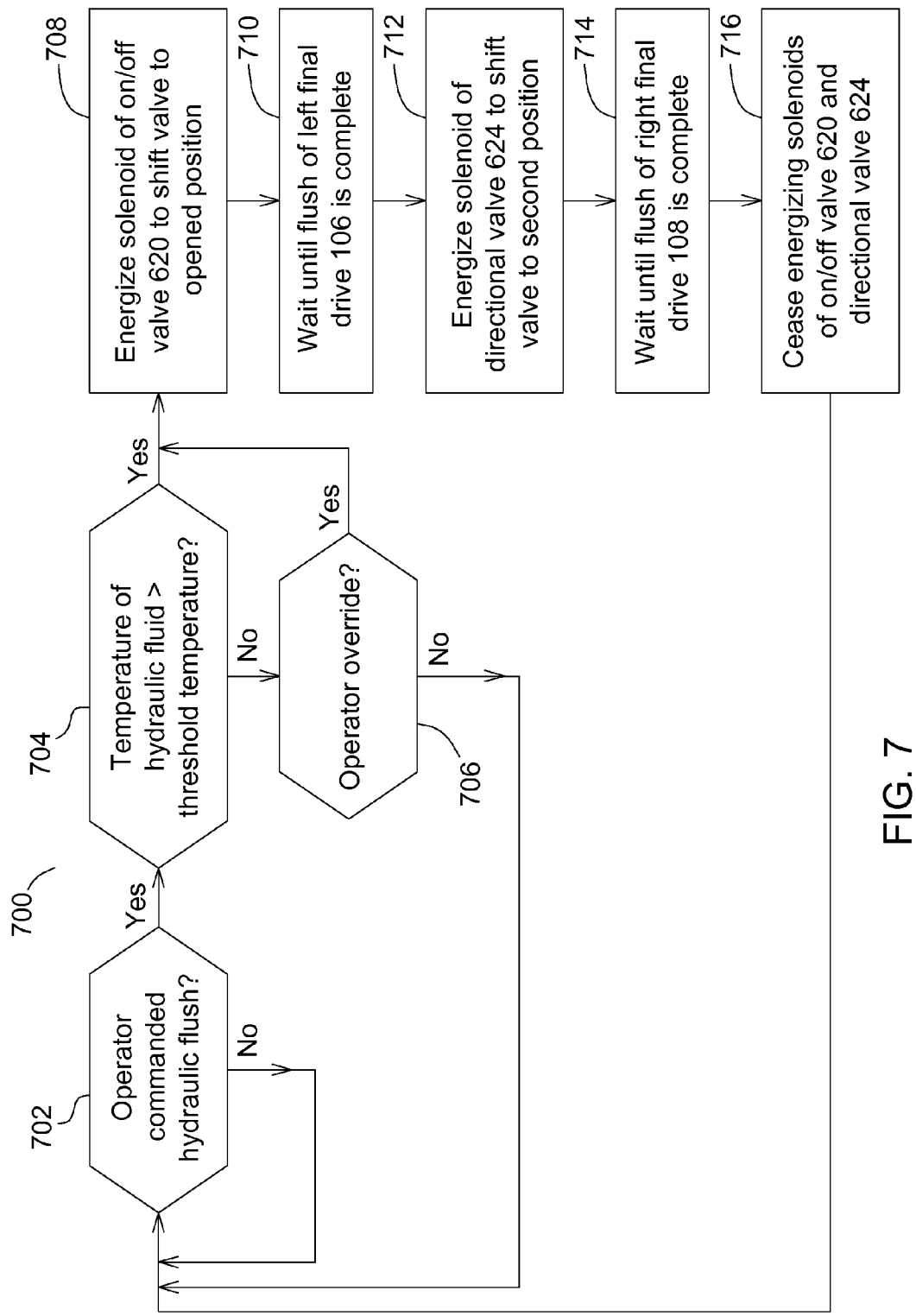
FIG. 7 is a flowchart for a method of using the hydraulic flushing system.

FIG. 7 is a flowchart illustrating control system 700 for using a hydraulic flushing system. In this embodiment, controller 640 on work vehicle 100 may execute control system 700, but in alternative embodiments, the steps may be performed by a series of controllers or the steps may be adjusted to be performed by an operator, including an operator actuating switches to energize the solenoids in flushing valve 200 or by an operator manually actuating flushing valve 200 such as through a lever positioned on or near flushing valve 200. Prior to step 702, the operator may unravel hydraulic line 230 from a storage position where it will not interfere with normal operation of work vehicle 100 and fluidly connect hydraulic line 230 to drain container 203.

In step 702, controller 640 senses whether the operator has commanded a hydraulic flush, in this embodiment a hydraulic flush of left final drive 106 and right final drive 108. In alternative embodiments, the operator could chose only to flush one of left final drive 106 or right final drive 108. If the operator has not commanded a hydraulic flush, step 702 will loop until the operator commands a flush. If the operator commands a flush, step 704 is performed next. In step 704, controller 640 determines whether the temperature of the hydraulic fluid in the system is above a threshold temperature, for example 100° F. Controller 640 may sense the temperature of the hydraulic fluid by sensing an input from a temperature sensor configured to measure the temperature of hydraulic reservoir 618. Controller 640 may also sense the temperature of the hydraulic fluid in other locations, such as by sensing an input from a temperature sensor configured to measure the temperature of hydraulic fluid flowing through port 608. If the temperature of the hydraulic fluid is not above the threshold temperature, step 706 would be performed next, if the temperature is above the threshold temperature step 708 would be performed next. This temperature check may help avoid hydraulic flushing occurring when the temperature of the hydraulic fluid is low enough to reduce the effectiveness of the hydraulic flush to an undesirable level. In step 706, controller 640 senses whether the operator has overridden the temperature check, and performs step 702 next if no override is detected and performs step 708 next if an override is detected. Step 706 may involve a prompt being displayed for the operator, for example on a monitor positioned within operator station 112, which notifies the operator that the temperature of the hydraulic fluid is below the threshold temperature and allows the operator an option to override the temperature check.

In step 708, controller 640 energizes the solenoid of on/off valve 620, shifting the valve to its opened position which will allow hydraulic fluid to flow through it. As the solenoid in directional valve 624 has not been energized, directional valve 624 should be spring-biased into its first position allowing hydraulic fluid to flow from on/off valve 620 to left final drive 106 through hydraulic line 222. Optionally, step 708 may involve energizing the solenoids in on/off valve 612 and relief valve 614, or adjusting the intensity with which such solenoids are energized. This optional step may be desirable or necessary to force hydraulic fluid to flow through flushing valve 200 instead of through on/off valve 612 or relief valve 614, and may be necessary or desirable if the hydraulic resistance of flushing valve 200 and the circuit downstream of flushing valve 200 is greater than the hydraulic resistance of cooling valve 202 and the circuit downstream of cooling valve 202.

Step 710 is performed next, and involves waiting until the flush of left final drive 106 is complete. In this embodiment, controller 640 will wait a predetermined amount of time, for example 10 seconds, until proceeding to step 712. In alternative embodiments, controller 640 may wait a different period of time, including, for example, an operator-selected amount of time, until the operator presses another button, or a dynamically determined wait time based on criteria such as the temperature of the hydraulic fluid, the amount of time since left final drive 106 was last flushed, or the duty cycle which left final drive 106 experienced since the last flush. Step 710, and step 714 described below, may be desirable to ensure that left final drive 106 and right final drive 108 are flushed a suitable amount of time. Too little flushing may result in incomplete contamination removal while too much flushing may reduce the hydraulic fluid level of work vehicle 100 below a suitable level or may result in a volume of flushed hydraulic fluid greater than the capacity of drain container 203.

Optionally, controller 640 could cease energizing the solenoid in on/off valve 620 after step 710 is complete and require the operator to command the hydraulic flush to continue before proceeding to step 712, and proceed to step 702 if the operator does not command the hydraulic flush to continue. Such a step may be desirable if drain container 203 may need to be replaced or checked between flushes to ensure it has sufficient capacity for the flush of right final drive 108. Additionally, control system 700 may permit the operator to cancel the flushing process at any time, returning on/off valve 620 to its closed position, directional valve 624 to its first position, and undoing any modifications made within control system 700 to how the solenoids in on/off valve 612 and relief valve 614 are energized.

In step 712, controller 640 energizes the solenoid in directional valve 624, shifting the valve from its first position allowing hydraulic fluid to flow to left final drive 106 to its second position allowing hydraulic fluid to flow to right final drive 108. In step 714, controller 640 waits until the flush of right final drive 108 is complete before proceeding to step 716, which may involve waiting a predetermined amount of time or waiting according to a different period of time as described above with reference to step 710. In this embodiment, left final drive 106 is flushed before right final drive 108 is flushed, but in alternative embodiments there may be only one gearbox to be flushed, multiple gearboxes may be flushed simultaneously, or multiple gearboxes may be flushed in a different order.

In step 716, controller 640 may cease energizing the solenoids in on/off valve 620 and directional valve 624. If controller 640 made adjustments to on/off valve 612 and relief valve 614 in cooling valve 202, such adjustments may also cease in step 716 so that work vehicle 100 may be returned to a normal operation state. Control system 700 may return to step 702 after completing step 716.

Although FIG. 7 is illustrated as a flowchart, the disclosure is not limited to such steps and the order of steps of presented, and it would be well within the skill of one of ordinary skill in the art to reorder, combine, or split many of the steps and achieve the same result.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A hydraulic flushing system, comprising:
a hydraulic machine including a case drain;
a gearbox having a cavity; and
a flushing valve fluidly connected to the case drain, fluidly connected to the cavity, and fluidly positioned between the case drain and the cavity, the flushing valve configured to selectively allow hydraulic fluid to flow from the case drain to the cavity;
wherein the hydraulic flushing system is configured to selectively allow hydraulic fluid to flow from the case drain of the hydraulic machine through the flushing valve to the cavity of the gearbox.

2. The hydraulic flushing system of claim 1, further comprising a hydraulic reservoir, the case drain fluidly connected to the hydraulic reservoir.

3. The hydraulic flushing system of claim 1, further comprising a hydraulic reservoir and a cooling valve, the cooling valve fluidly connected to the case drain and fluidly connected to the hydraulic reservoir, the cooling valve fluidly positioned between the case drain and the reservoir, the cooling valve configured to selectively allow hydraulic fluid to flow from the case drain to the hydraulic reservoir.

4. The hydraulic flushing system of claim 3, further comprising a cooler fluidly connected to the cooling valve and fluidly connected to the hydraulic reservoir, wherein the cooler is fluidly positioned between the cooling valve and the hydraulic reservoir.

5. The hydraulic flushing system of claim 1, wherein the cavity is fluidly connected to a drain container through the flushing valve.

6. The hydraulic flushing system of claim 5, further comprising a drain hose, the drain hose fluidly connected to the flushing valve, fluidly connected to the drain container, and fluidly positioned between the flushing valve and the drain container.

7. The hydraulic flushing system of claim 1, wherein the hydraulic machine is a hydraulic pump.

8. The hydraulic flushing system of claim 1, wherein the hydraulic machine is a hydraulic motor.

9. The hydraulic flushing system of claim 1, wherein the case drain is included in a hydraulic pump, the gearbox is a final drive, the flushing valve has an on/off valve, and the flushing valve is configured to allow hydraulic fluid to flow from the case drain to the cavity through the flushing valve when the on/off valve is in an on position and to prevent such flow when the on/off valve is in an off position.

10. The hydraulic flushing system of claim 9, wherein the final drive is a first final drive, the cavity is a first cavity, the hydraulic flushing system comprises a second final drive, the second final drive comprises a second cavity, the flushing valve has a directional valve, and the flushing valve is configured to allow hydraulic fluid to flow from the case drain to the first cavity when the on/off valve is in an on position and the directional valve is in a first position and to allow hydraulic fluid to flow from the case drain to the second cavity when the on/off valve is in an on position and the directional valve is in a second position.

11. A method of hydraulic flushing, comprising:
   operating a work vehicle in a manner which causes hydraulic fluid to flow from a case drain of a hydraulic machine of the work vehicle; and
   actuating a flushing valve to direct the hydraulic fluid to flow from the case drain through a cavity of a gearbox;
   wherein the actuating step directs hydraulic fluid to flow from the case drain of the hydraulic machine through the flushing valve to the cavity of the gearbox.

12. The method of claim 11, further comprising collecting the hydraulic fluid in a drain container after it has traveled through the cavity.

13. The method of claim 12, further comprising actuating the flushing valve to cease directing the hydraulic fluid to flow from the case drain through the cavity after the collecting step.

14. The method of claim 13, wherein the operating step comprises idling an engine of the work vehicle.

15. A hydraulic flushing system for a work vehicle, comprising:
   a hydraulic pressure source included in the work vehicle;
   a first final drive having a first cavity;
   a second final drive having a second cavity;
   a flushing valve having a first port, a second port, and a third port, the first port fluidly connected to the pressure source, the second port fluidly connected to the first cavity, and the third port fluidly connected to the second cavity;
   wherein, the flushing valve is configured to prevent hydraulic fluid flow through the first port in a first mode and to allow hydraulic fluid flow from the first port to the second port in a second mode.

16. The hydraulic flushing system of claim 15, wherein the flushing valve is configured to allow hydraulic fluid flow from the first port to the third port in a third mode.

17. The hydraulic flushing system of claim 16, wherein the flushing valve further comprises an on/off valve and a directional valve, the directional valve is fluidly positioned downstream of the on/off valve, the flushing valve is in the first mode when the on/off valve is in an off position, is in the second mode when the on/off valve is in an on position and the directional valve is in a first position, and is in the third mode when the on/off valve is in the on position and the directional valve is in a second position.

18. The hydraulic flushing system of claim 17, wherein the flushing valve further comprises a fourth port, a fifth port, and a sixth port, the fourth port fluidly connected to the first cavity, the fifth port fluidly connected to the second cavity, and the sixth port fluidly connected to the fourth port, the fifth port, and a drain container.

19. The hydraulic flushing system of claim 18, wherein the hydraulic pressure source is a case drain of a hydraulic machine.

* * * * *